June 20, 1944.  N. MILNER  2,351,829
VEHICLE CONSTRUCTION
Filed July 1, 1940  4 Sheets-Sheet 1
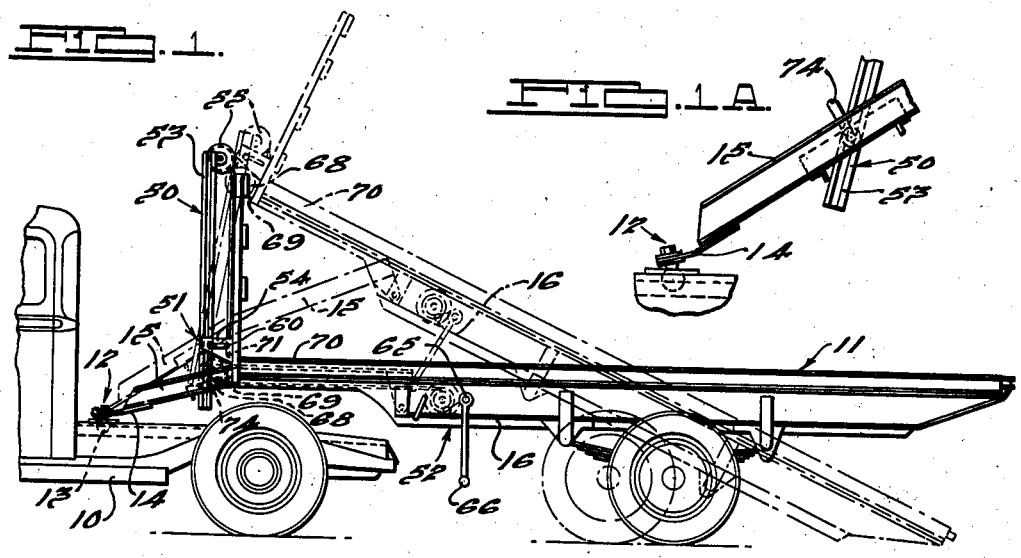
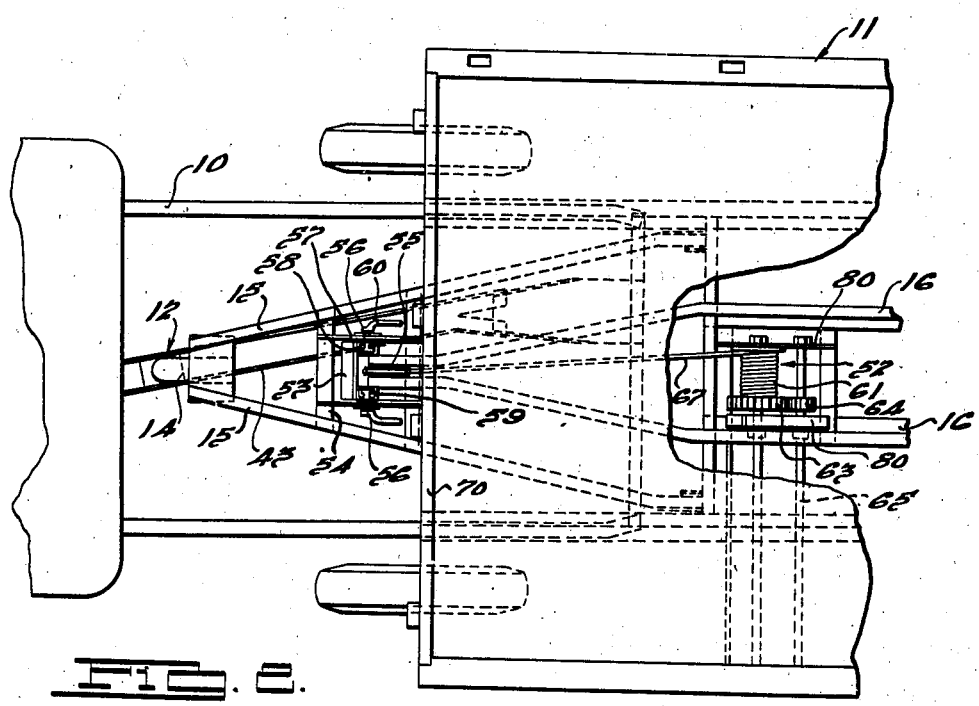
INVENTOR
Nugent Milner.
BY Pile, Calver & Gray.
ATTORNEYS.

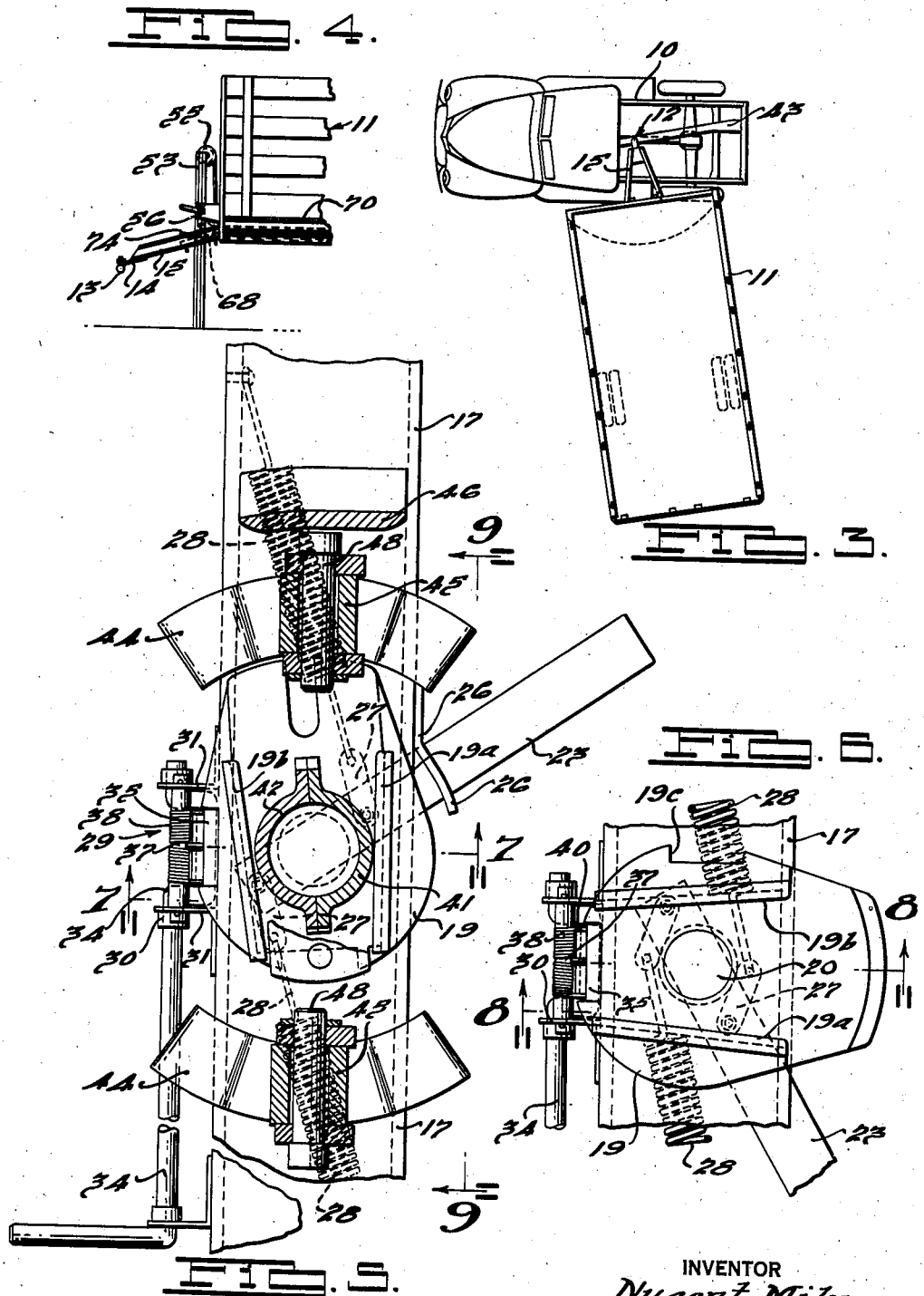

June 20, 1944.　　　　　N. MILNER　　　　　2,351,829
VEHICLE CONSTRUCTION
Filed July 1, 1940　　　　4 Sheets-Sheet 3
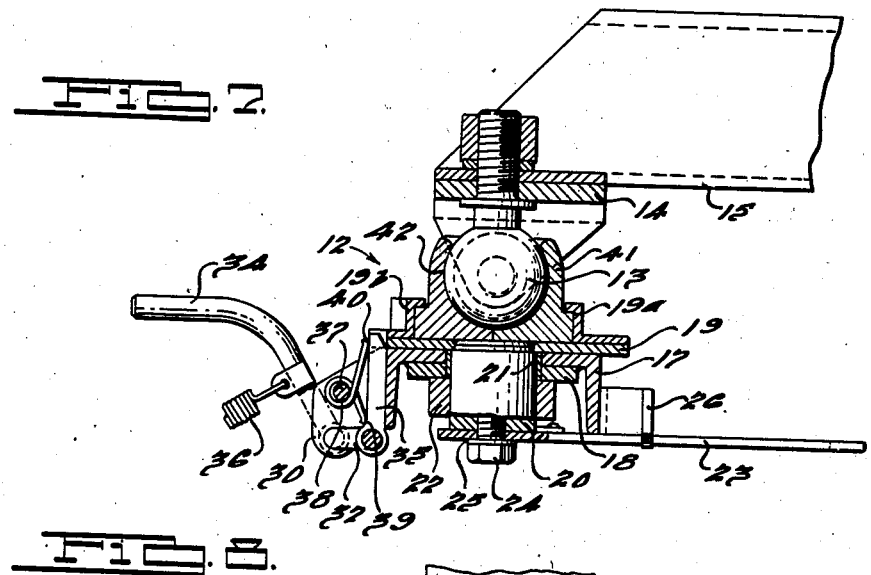
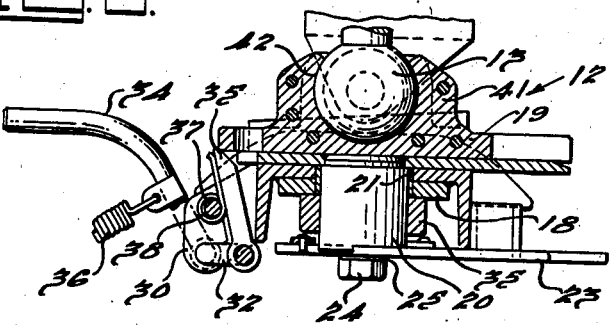
INVENTOR
Nugent Milner.
BY Dike, Calver & Gray
ATTORNEYS.

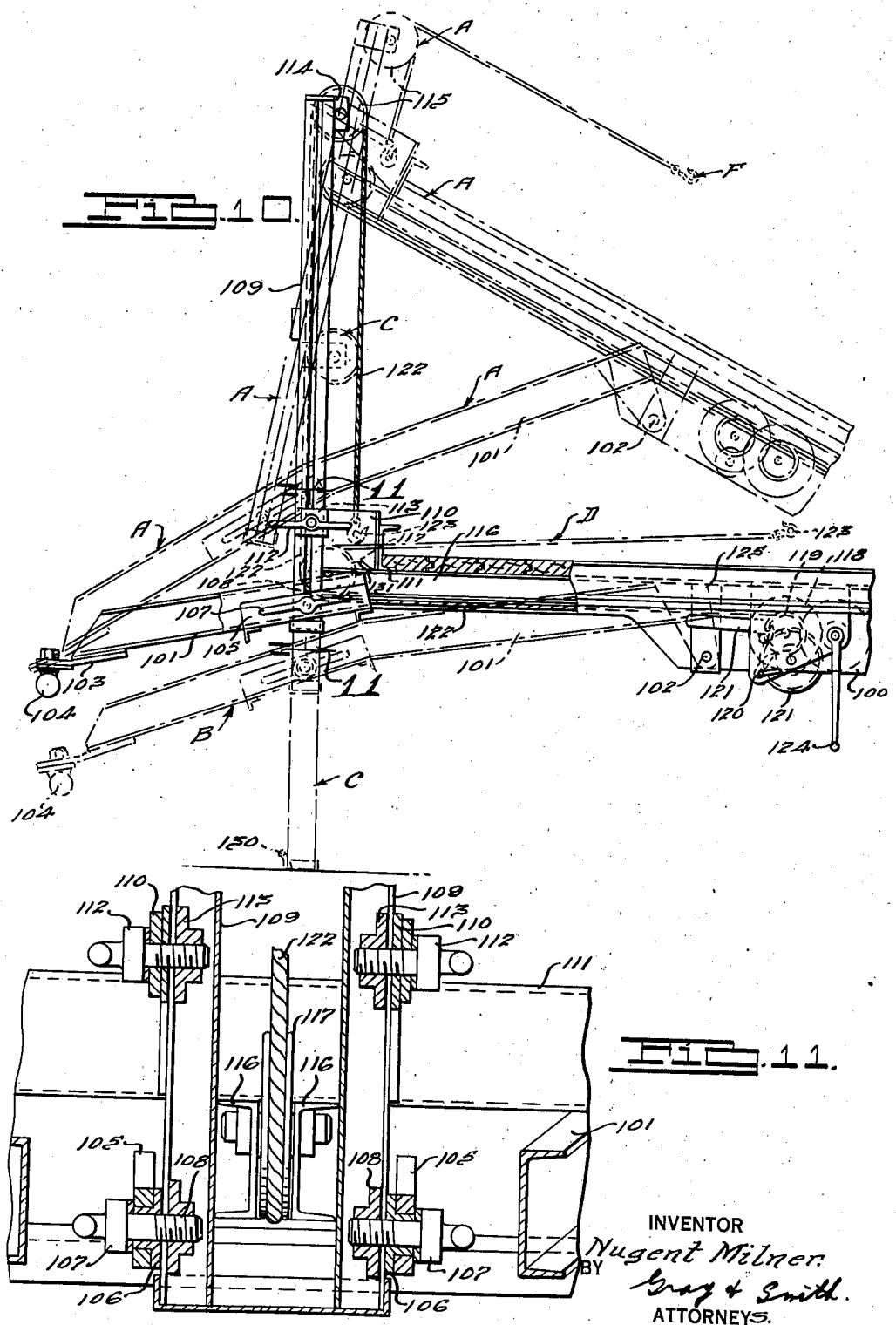

Patented June 20, 1944

2,351,829

UNITED STATES PATENT OFFICE 2,351,829

VEHICLE CONSTRUCTION

Nugent Milner, Dearborn, Mich., assignor by mesne assignments, to himself and Sarah Ann Milner Application July 1, 1940, Serial No. 343,329

10 Claims. (Cl. 280—33.1)

The present invention relates to vehicle construction and particularly to vehicles of the so-called tractor semi-trailer type. The vehicle construction of the present invention is particularly but not exclusively adapted to provide a vehicle of general utility which may be readily adapted to perform a wide variety of types of work. One use to which a vehicle construction of the present invention is particularly suited is as a general utility vehicle for use on farms. It is to be understood, however, that the vehicle construction of the present invention is intended to be used in any field of transportation where its structural features renders it suitable Among the objects of the present invention are the following:

First, to provide a novel vehicle construction of the tractor semi-trailer type which is of general utility and in which the traction vehicle may be readily substituted to permit the ready exchange of various types of tractors or propulsion units for use with the trailer unit.

Second, to provide a vehicle construction of the tractor semi-trailer type and in which the structural features embodied in the trailer permit its use as a general utility vehicle which readily adapts it for the hauling of various types of materials and goods, the general utility of the trailer being such that it is adapted for many uses such for example as the general hauling of objects on a farm.

Third, to provide an improved vehicle construction of the tractor semi-trailer type in which the novel structural features of the semi-trailer are so combined and coordinated as to provide a vehicle of general utility and which is constructed and designed to permit a ready tilting of the body of the trailer unit to facilitate the loading or unloading of said trailer.

Fourth, to provide a vehicle construction including vehicles of the tractor semi-trailer type in which novel means are provided for turning the combined vehicles on a very short radius, thus facilitating the maneuverability of the vehicle and making it feasible to use such a vehicle in many fields of operation where tractor-trailer vehicles of conventional design and construction may not be readily used because of the less-maneuverable characteristics of such conventional constructions.

Fifth, to provide a vehicle construction in which a novel type of fifth wheel mechanism is employed to permit the coupling of the tractor and the trailer vehicles, the coupling being adapted to permit a limited and controlled universal movement of the trailer unit relative to the traction unit.

Sixth, to provide a vehicle construction of the tractor-trailer type which is particularly characterized in that the entire unit is readily adaptable for transportation of a wide variety of objects, the tractor unit and the trailer unit both being readily adaptable for use in hauling a wide variety of objects to be transported, the traction unit having provision whereby the fifth wheel mechanism and the body structure of the tractor may be readily inter-changed so that the tractor may be used as an independent unit or may be used as an integral unit of the tractor-trailer combination.

Seventh, to provide a vehicle construction of the tractor semi-trailer type which is relatively economical to construct and operate; which is of a rugged and durable construction, and which readily lends itself to large scale manufacture on a production basis.

Eighth, to provide a vehicle construction of the tractor-trailer type, in which the trailer construction is of the two-wheeled or semi-trailer type and in which means positioned adjacent the forward end of the trailer is provided to act both as a part of a trailer body hoisting mechanism and which is effective to act as a supporting leg for the forward end of the trailer unit when the tractor and trailer are disconnected, the supporting leg thus provided being adjustable so as to vary the height of the forward end of the trailer from the ground, to permit the ready coupling and uncoupling of the traction vehicle from the trailer under a wide range of operating conditions.

Ninth, to provide a novel fifth wheel mechanism including separate units, one of which may be readily attached to or dismounted from a tractor vehicle or which may be located on the traction vehicle in such a manner that when the trailing vehicle is disconnected, an inter-changeable demountable body may be applied to the traction vehicle to convert it into a light pick-up unit which may be readily used for many purposes.

Tenth, to provide a vehicle construction of the tractor-trailer type and in which a fifth wheel interconnecting the tractor and trailer units is mounted well forward of the driving wheels of the traction vehicle, thereby improving the operation and safety of the unit by distributing a portion of the weight of the trailer unit to the steerable wheels of the traction vehicle, and at the same time permitting the turning of the coupled vehicles in a relatively short turning radius, thereby imparting increased maneuverability to the combined vehicles.

Eleventh, to provide a vehicle construction of the tractor-trailer type in which there is provided a novel construction of fifth wheel which permits the tilting of the trailer unit for the purpose of elevating the forward end of the body of the trailer to facilitate loading or unloading regardless of the angular position of the tractor and trailer units.

Twelfth, to provide a vehicle construction of the tractor-trailer type in which provision is made for hoisting the forward end of the trailer vehicle for tilting the body to permit the dumping of objects contained therein or to assist in loading of the trailer, the hoisting arrangement consisting of a novel combination of a jib pole or mast in combination with hinged draw-bars forming a part of the trailer construction and a winch or similar device, operatively connected between the jib pole and the draw-bars, to provide the required power to lift the forward end of the trailer, pivot the hinged draw-bars, and elevate the forward end of the trailer body.

Thirteenth, to provide a vehicle construction of the tractor-trailer type in which provision is made for adjusting the hinged draw-bars forming a part of the trailer construction to thus make the trailer readily adapted for use either with a traction device of the automotive truck type which normally requires a relatively high point of connection between the trailer and the truck or of the type of a farm traction unit or similar vehicle which normally requires a connection at a relatively low point between the vehicles.

Fourteenth, to provide a vehicle construction of the tractor-trailer type in which the trailer may be elevated to a tilted position to facilitate the loading and unloading of objects therefrom and in which a positive locking device is provided which will lock the trailer body in a tilted position thus permitting the disconnection of the hoisting mechanism from the trailer body and making it available for use in connection with the loading or unloading of objects on the tilted trailer body.

Fifteenth, to provide a vehicle construction of the tractor-trailer type in which the fifth wheel mechanism interconnecting the traction and trailer units is designed and constructed in such a manner as to permit operation of the vehicles while the trailer body is in a tilted or partially tilted position.

Sixteenth, to provide a vehicle construction of the tractor-trailer type in which a fifth wheel mechanism is provided which is of the automatic type not illustrated in description and which is particularly designed to assure the maximum latitude in operating the combined tractor-trailer units while the component elements of the unit may be in any desired operating position, that is, the trailer body may be tilted regardless of the position of the traction vehicle or the traction vehicle may be readily moved regardless of the tilted or elevated position of the body on the trailer vehicle.

Seventeenth, to provide in connection with the coupling device suitable automatic devices, whereby the operator may while in the driver's seat of the truck tractor, couple to and lock the trailer to the traction vehicle, with coupling connections which will allow the trailer to rock, sway, or swing in any direction independently of the traction vehicle.

Eighteenth, to provide in connection with the truck traction vehicle, and the semi-trailer either with or without the hinged draw-bars and hoist, a fifth wheel coupling device which may be connected automatically or manually, and which will allow the trailer to swing sideways or up and down independently of the traction vehicle, the rocking motion being taken care of by the springs on the traction vehicle.

Other objects and advantages of this invention will be apparent from the following detailed description considered in connection with the accompanying drawings submitted for purposes of illustration only and not intended to define the scope of the invention, reference being had for that purpose to the subjoined claims.

In the drawings wherein corresponding parts are designated by corresponding reference numerals in the several figures:

Fig. 1 is a side elevation of a semi-trailer embodying the present invention coupled to a traction vehicle, in this instance a motor truck which is shown in fragmentary side elevation, the solid line view showing the trailer in its normal or untilted position and the dotted line view showing the trailer body when in its tilted or elevated position.

Fig. 1A is a side elevation illustrating a portion of the mechanism of Fig. 1 in the elevated position.

Fig. 2 is a fragmentary top plan view with parts broken away showing the coupling and body elevating or hoist mechanism secured to the forward end of the trailer vehicle.

Fig. 3 is a plan view of the tractor-trailer combination shown in Fig. 1, and showing the relative positions of the traction vehicle and the trailer vehicle and showing the tractor turned relative to the trailer vehicle at an extreme angle.

Fig. 4 is a fragmentary view in side elevation showing the forward end of the trailer vehicle when disconnected from the traction vehicle and showing the jib pole or mast lowered and used as the adjustable supporting leg for the forward end of the trailer vehicle.

Fig. 5 is a horizontal section taken through the fifth wheel mechanism and showing the tractor and trailer parts of the fifth wheel in their coupled position.

Fig. 6 is a fragmentary plan view of a portion of the fifth wheel showing the tractor carried portion with the trailer carried portion disconnected therefrom.

Fig. 7 is a sectional view taken substantially on the staggered section line 7—7 Fig. 5 in the direction of the arrows.

Fig. 8 is a section taken substantially on the staggered section line 8—8 Fig. 6 in the direction of the arrows.

Fig. 9 is an elevation with parts broken away taken substantially on the line 9—9 of Fig. 5 looking in the direction of the arrows but showing the parts of the fifth wheel mechanism in the uncoupled position as shown in Fig. 6.

Fig. 10 is a fragmentary longitudinal sectional view of a portion of the device illustrated in Fig. 1, shown to a larger scale to more clearly illustrate the structure involved.

Fig. 11 is a vertical sectional view of the jib pole and operating mechanism therefor of Fig. 10.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the vehicle construction of the present invention comprises in general a traction unit 10, in the present instance a conventional type of motor truck. The term "tractor" or "traction vehicle" as used herein refers to any type of vehicle adapted to impart a tractive effort to the trailer when coupled thereto. A trailer vehicle 11, which in the present instance is of the two-wheeled or so-called "semi-trailer" type, is adapted for detachable connection with the traction vehicle 10. A fifth wheel coupling 12, having parts carried by the tractor and parts carried by the trailer, permits a detachable coupling of the trailer 11 to the tractor 10.

*Description of fifth wheel mechanism*

The fifth wheel mechanism is best shown in Figs. 5 to 9, inclusive, and includes a depending ball member 13 and socket 42 which is secured to the forward end 14 of the pivoted draw-bars 15 which are pivotally connected to the fixed trailer frame members 16 (see Fig. 1). The fifth wheel 12 comprises the following parts which are mounted on the traction vehicle 10 and are hereinafter referred to as the tractor-carried portions of the fifth wheel. Referring to Fig. 5, a tractor draw-bar 17 is attached to the chassis of the tractor 10 and is provided with a central reinforcing plate 18 (see Figs. 7 to 9) which carries a swivel plate 19 and a pocket. The swivel plate 19 and the pocket are mounted on the swivel plate shaft 20 which projects through the bearing hole in the draw-bar 17 and the reinforcing plate 18 and is journaled in a bushing bearing 21 which may be formed of bronze or other suitable material and which may be provided in the bearing hole. A collar 22 is provided on the shaft 20 and holds the pocket and plate 19 in the operating positions. A handle 23 is attached to the shaft 20 and is preferably held in place thereon by means of the capscrew 24 and the lockwasher 25. The handle 23 is adapted for swinging movement to rotate the shaft 20 and is adapted to be engaged by a notched stop and catch 26 which is secured to the tractor draw-bar 17. The handle 23 is connected with links 27, each of which has one end secured to a tension spring 28 operably connected to the tractor draw-bar 17.

A locking device assembly 29 is attached to the draw-bar 17 and is mounted on a bracket 30 attached to said draw-bar. The locking device comprises guide plates 31 for determining the locking location, and an unlocking control bar 32 (see Figs. 7 and 8) which is connected with a crank having an operating lever 34. The operating lever 34 is connected with a locking latch member 35 through the control bar 32. The operating lever 34 and the latch member 35 may be maintained in their desired positions in the locking device assembly 29 by means of a tension spring 36 (Figs. 7 and 8).

A pin 37 is preferably connected between the brackets 30 and acts as a supporting member for a spring 38 having its terminal ends 39 and 40 maintained in contact with the latch member 35 to urge the latch member 35 inwardly toward the plate 19.

The part of the fifth wheel coupling which is carried by the trailer vehicle 11 is the bolster 41, which carries the socket 42 for the reception of the ball 13, which as previously described, is secured to the draw-bars 15. The trailer vehicle 11 normally supports and carries the bolster 41 and the socket 42 when the vehicles are in the uncoupled positions as illustrated in Fig. 4.

The operation of the fifth wheel mechanism will now be described in connection with the coupling of the trailer 11 to the traction vehicle 10. The parts of the tractor-carried portions of the fifth wheel, when in the uncoupled position, are shown in Fig. 6. As there shown, the plate 19 is turned substantially at right angles to the position which it occupies when the parts are in the coupled position as shown, for example, in Fig. 5. This is accomplished by turning the handle 23, which through the shaft 20 causes movement of the plate 19. When in this position, the guideways 19a and 19b occupy the position shown in Fig. 6 and provide a flared or tapered path into which the bolster 41 carrying the socket 42 and the ball 13 may be readily received. When the bolster 41 carried by the trailer vehicle 11 reaches the end of the permitted movement in the ways 19a and 19b, the handle 23 may be rotated to the position shown in Fig. 5 whereupon the plate 19 is rotated through an arc of approximately 90° to the position shown in Fig. 5, at which time the latch member 35 engages in the slot 19c formed in the plate 19.

Thus when the vehicles are coupled, it will be seen that the tractive effort of the tractor vehicle 10 is transmitted to the trailer vehicle 11 through the medium of the tractor draw-bar 17 and through the portions of the fifth wheel mechanism which are attached thereto. It will also be seen that none of this tractive effort is transmitted through the coupling lock since the only function of the lock 35 is to maintain the plate 19 in the position shown in Fig. 5 and to prevent unintended movement to the unlocked position shown in Fig. 6. The movement of the plate 19 from the position shown in Fig. 6 to the position shown in Fig. 5 is accomplished, as previously stated, by movement of the handle 23. Movement of the plate 19 in the opposite direction is normally restrained by the locking of the handle 23 by the catch member 26.

In order to facilitate coupling of the trailer 11 to the traction vehicle 10, I provide a guideway 43 extending from the rear of the tractor 10 to a point adjacent the tractor draw-bar 17 and which will receive the bolster 41 carried by the trailer and guide it towards the tractor-carried portions of the fifth wheel coupling.

The fifth wheel mechanism may also include a bearing plate 44 associated with the tractor draw-bar 17 and adapted to receive rollers 45 which are secured to the plate attached to the forward end 14 of the pivoted draw-bars 15 of the trailer vehicle. By providing the bearing plates 44 with inclined end portions, as illustrated in Fig. 9, it will be seen that a portion of the load of the trailer vehicle is gradually transferred from the trailer vehicle 11 to the traction vehicle 10 as the tractor is moved to a coupled position with the trailer vehicle 11. Also it will be seen that this provision supports the weight of the trailer and its load on the rollers 45 which engage the bearing plate 44. Thus, the coupling portion of the fifth wheel member which has previously been described, is not subjected to the load of the trailer since this load is carried by the plate 44. If desired, brackets 46 may be provided to engage with extending studs 47 to protect the ball and socket coupling mechanism previously described, from strains imposed thereon by relative movement of the trailer-carried portion of the fifth wheel in the vertical direction relative to the tractor-carried portion of the fifth wheel. The rollers 45 are preferably mounted on shafts 48 which project towards the center of the ball 13 of the ball and socket portion of the coupling. If desired, the extending studs 47 may be formed as here shown as an integral part of the shafts 48.

The coupling device operates automatically to lock the tractor and trailer units in the assembled relation when they are moved together. To accomplish this the draw-bars 15 of the trailer unit are positioned at the desired height to align the separable parts of the fifth wheel carried by the tractor and trailer units by manipulation of the vertically movable jib or parking leg. The bolster 41 including the ball and socket connections 13 and 42 respectively is aligned with the guideway 43 carried by the tractor unit. When the bolster 41 engages the latch member 35 spring 38 is tensioned by movement of the latch member 35 out of the end pocket of the plate 19 thereby releasing the plate 19 which rotates under the influence of springs 28 from the unlocked position illustrated in Fig. 6 to the locked position illustrated in Fig. 5 where the latch member 35 is moved by the spring 38 into the pocket forward in the side of the plate 19. As the plate 19 is rotated by the springs 28, the handle 23 is also moved from the position illustrated in Fig. 6 to the position illustrated in Fig. 5 where the catch 26 engages it to prevent unintentional disassembling of the coupling unit. To release the coupling the handle 23 must be depressed to disengage it from the catch 26 and rotated to unlock the coupling.

It will thus be seen that the fifth wheel coupling member of the present invention includes the ball and socket king pin member, the means for coupling and uncoupling the tractor-carried portion from the trailer-carried portion and for locking the parts in their coupled positions, and a bearing plate carried by the tractor which is adapted to support and carry the load of the trailer vehicle. This construction, as will be hereinafter more fully described, permits a pivoting or hinged movement of the forward end of the trailer frame relative to the fifth wheel mechanism when the forward end of the trailer frame is elevated as hereinafter set forth. The fifth wheel coupling thus provides the ball and socket connection for transmitting the traction effort of the tractor-trailer vehicle 10 to the trailing vehicle 11, and the supporting plate and brackets for carrying the weight of the trailer on the tractor independently of the ball and socket connection previously described.

*Trailer elevating mechanism*

The trailer actuating mechanism consists of a hoist indicated in general by the numeral 50, a lock indicated in general by the numeral 51 for locking the hoist mechanism, and a winch 52. The hoist 50 includes a mast or jib 53 which is mounted on a bracket 54 for movement relative thereto. The bracket 54 is secured to the pivoted draw-bars 15 on the trailer 11. A cable sheave 55 is attached adjacent the top of the mast or jib 53. The jib lock 51 includes adjustable locking members 56 which are adapted to adjustably lock the mast or jib 53 at any desired elevation against movement relative to the bracket 54. The locking members 56 are carried by brackets 57 which are secured to the trailer body frame 70 and extend downwardly thereof. While any suitable type of locking members may be employed, it is preferable that the type shown in Fig. 2 be employed which comprise generally T-shaped locking members 59 which are disposed within channels 58 formed in the mast or jib 53. The locking members 59 are moved to locking or unlocking position by actuation of the lock handles 60.

This structure is illustrated in larger scale in Figs. 10 and 11 to more fully disclose the invention.

The winch 52 employed in the present embodiment of the invention includes a rotatable cable drum 61 which is mounted on brackets 80 which are secured to the fixed trailer frame portion 16. Suitable means may be provided for rotating the rotatable cable drum 61 such for example as a gear 63 mounted on the drum 61 or on the shaft carrying said drum. The gear 63 preferably meshes with a reduction gear 64 provided on the rotatable operating shaft 65. The drum 61 may be held against unintended reverse movement by means of a suitable locking dog and ratchet associated with the gears of the winch 52. A crank 66 which if desired may be detachably connected to a shaft 65 is provided for the manual actuation of the drum 61. It is to be understood, however, that any other suitable type of winch member may be used, such for example as a power-driven member, or the like.

The winch 52 is connected through the hoist 50 for elevating or lowering the forward end of the body of the trailer by means of a cable 67, one end of which is secured to the drum 61. The cable 67 extends from the drum 61 through a cable sheave 68 which is mounted on a bracket 69 and is secured to the body sill member 70 or other suitable structural part of the trailer vehicle. The cable is threaded through the sheave 55 and is detachably connected to the forward portion of the trailer body at a suitable point 71.

The hoist mechanism previously described may be used as shown in Fig. 1 for the purpose of elevating the trailer body shown in the normal substantially horizontal position in solid line to any desired elevated position as shown in dotted line, or it may be used to support the forward end of the trailer vehicle when it is detached from the tractor as shown in Fig. 4. When used in connection with the elevation of the forward end of the trailer as shown in Fig. 1, the winch mechanism 52 is operated, the cable 67 is shortened and the forward end of the trailer body is elevated to any desired extent. When the trailer 11 is raised to the elevated position as shown in the dotted line view of Fig. 1, it is to be noted that the pivoted frame members 56 have pivoted relative to the fixed frame members 16 and the distance between the centers of the hubs on the tractor vehicle and on the trailer vehicle has been shortened. The movement is accommodated by pivoting of the ball 13 in the socket 42. This movement is permitted by a pivoting of the forward ends of the trailer draw-bars 15 about a line which is coincidental with the center of the ball and socket king pin connection and the shafts 48 which carry the rollers 45. This is the hinged or pivoting movement permitted in the fifth wheel mechanism which has previously been referred to.

When the trailer is in the dotted line position shown in Fig. 1, it may be supported in this position by adjustment of locking member 74 which locks the forward end of the trailer to the mast or jib 53. The locking members 74 are similar in construction and operation to the locking members 56 which are employed to lock the mast or jib 53 relative to the bracket 54 to hold the front end of the trailer in a desired elevated position. When the trailer body has thus been locked in a desired angular position, the cable 67 may be disconnected from the point 71 of the trailer body and the winch mechanism 52 and cable 67 be thus made available to assist in the loading of objects on the angularly inclined trailer body.

When the body has been loaded and it is desired to return the body to its initial substantially horizontal position as shown in the solid line view of Fig. 1, the cable 67 is again attached to the point 71 and the body gradually returned to its normal substantially horizontal position. If desired, a clutch or brake member may be provided in the winch mechanism 52 so as to assist in the lowering of the forward end of the trailer body to its substantially horizontal position.

When the vehicles are uncoupled, the mast or jib 53 may be lowered and locked in the lowered adjusted position by means of the locking mechanism 56 so as to occupy the position shown in Fig. 4. It will be seen that the height of the leg may be controlled by operation of the winch 52 so that the depending ball 13 of the fifth wheel mechanism may be maintained at any desired elevation above the surface of the ground for coupling to a traction vehicle.

It will thus be seen that the mast or jib 53 serves the dual function of forming an integral part of the hoisting mechanism and at the same time acts as the supporting leg for the forward end of the trailer vehicle when the vehicles are in their uncoupled positions.

The construction herein shown and described utilizes the pivoted draw-bars 15 forming a part of the trailer frame. The draw-bars 15 project a substantial distance forward of the fixed frame 16 and the body frame 70 of the trailer vehicle. This allows the trailer 11 to swing relative to the traction vehicle 12 at an extreme angle such as that shown, for example, in Fig. 3. The use of the extending frame members 15 of the trailer vehicle also permits mounting of the tractor-carried portions of the fifth wheel at a point well forward of the tractor vehicle drive wheels. This location is desirable since it distributes the load over the all road-contacting wheels of the tractor 10 and as the tractive effort of this vehicle is transmitted to the trailer 11, there is a direct pull on the trailer without removing the load from the front wheels of the tractor. Thus there is no loss of steering control of the tractor as so often occurs in tractor-trailer constructions of conventional designs. This is due to the fact that the draw of the tractor vehicle is distributed to the trailer from the drive wheels of the tractor vehicle to the center of the wheel or axle which may act as a hinge point if the load is distributed at a point to the rear of such axle. Since no such hinge point and no such weight distribution are intended, the tendency to raise the front portion of the tractor when the tractive effort is first applied is reduced and the load is substantially uniformly distributed over the road-contacting wheels of the tractor vehicle, my improved vehicle construction therefore operates in a much better manner than other similar devices now on the market and embodies a much higher factor of safety in that the load of the trailer unit is well distributed over all of the wheels of the traction vehicle whereby there is less danger of the steerable wheels being unloaded during heavy pulls and the possibility of the unit "jack-knifing" is practically eliminated.

Figs. 10 and 11 more clearly disclose certain of the operating characteristics discussed above. It will be noted that a trailer frame indicated generally by the numeral 100 is provided with draw-bars 101 pivoted thereto at 102 and extending well forward of the trailer frame 100. When the vehicle is used as a semi-trailer in connection with such traction vehicles as trucks or automotive tractors, the connection or fifth wheel may be placed well forward of the traction driving wheels. This adds stability and increases the operating performance of the vehicle combination. This type of connection permits the trailer vehicle to swing relative to the traction vehicle at an extreme angle as illustrated in Fig. 3.

These extended pivoted draw bars 101 form a part of the combination which makes possible the use of this trailer equipment with a variety of types of traction vehicles.

Brackets 105 form a part of the draw bar assembly which supports a suitable jib pole or hoisting beam 109. The jib pole 109 may be adjustably clamped in suitable pivot bearings 106 located in brackets 105, forming a part of a lower portion of a jib pole locking device. Suitable locking bolts 107 are threaded into locking nuts 108 having square edges to prevent turning in the jib pole tube while the locking bolt is operated.

The locking bolt 107 projects through the pivot bearings 106 slidably mounted in a groove which extends the full length of the jib pole 109. The flanges on the jib pole 109 are clamped between the nut 108 and the pivot bearing 106 to lock the jib poles in any desired up and down position relative to the draw bars 101. The bearing 106 is free to move in the brackets 105 thereby forming the pivot for the elevating or hoisting movements.

The jib pole or hoisting beams 109 are preferably made from a rectangular tubular section with a slot running the full length of one side. This slot forms a runway to permit the locking bolts to move longitudinally of the jib 109.

The jib pole 109 may also be detachably connected to the trailer frame member 100 by a suitable locking device 112. A bracket 110 is fixed to a portion of the trailer frame 100. The locking device 112 includes manually operable bolts and locking nuts 113.

Suitable sheave brackets 114 are attached to the upper end of the jib pole 109. These brackets form bearings for an upper sheave 115. The lower sheave brackets 116 are attached to the trailer frame 100 and act as guides sliding up and down between the jib poles thereby rigidifying these parts. A lower sheave 117 is attached between the brackets 116.

A suitable winch or force multiplying means may be provided to actuate the various parts which it may be desired to move. The winch may have a drum 119 and may be a geared two-speed type operated by a crank or a power driven member may be provided. A winch locking dog 120 and a brake 121 may if desired be provided to control the winch.

An operating cable 122 is attached to and wound around a drum 119. The cable 122 is threaded under the lower sheave 117, up and over the upper jib pole sheave 115 and down to and attached to bracket 110. The cable may be provided at its free end with a grab hook 123, to facilitate attachment to objects. A handle 124 may be provided to control the winch.

On the heavier types of trailers where the jib poles are too heavy to be raised from the parking leg position manually, power from the winch may be employed by disconnecting the cable from bracket 110 and threading the cable under a plate 131, over the sheave 117 and down to bracket 130 on the bottom of the jib pole.

If desired, the winch and cable can be employed to elevate both the trailer frame 100 and the draw bar members 101 when the trailer is unhooked from the tractor vehicle and is supported on the jib member 109.

While this improved mechanism is capable of performing many operations in material handling and transportation, the performance of the basic functions which make the various operations possible will now be described.

First: The elevating or hoisting and locking of the trailer in various heights from the normal position as shown attached to traction vehicle in Fig. 1 and Fig. 10: The solid lines in these figures illustrate the trailer in its horizontal or normal position with the draw bars locked at a height suitable for attaching the trailer vehicle as a semi-trailer, to what is generally known in this art as an automotive tractor.

In performing the operation of hoisting or elevating the trailer body, the upper lock bolt 112 should be loosened. The dog 120 holding the trailer in raised position is left in contact with its associated gears to act as a stop member. The winch is then operated by turning the crank 124. The cable 122 is wound on the drum 119, shortening the distance between the sheave 117, the cable hook brackets 110 attached to the trailer frame and the upper sheave 115 which is pivoted to the draw bars 101, through the jib poles 109. During this operation the draw bars 101 pivoted at opposite ends to the points 102 to the trailer and at 104 to the tractor vehicle, moves angularly about the point 104. The jib pole 109 is locked to the draw bars 101 and is pivoted in the bearing 106.

As the trailer is raised, the upper locking bolt 112 slides vertically in the grooves extending the full length of the jib pole 109. When the trailer is in the described tilted position the locking bolt may be tightened to hold it in a desired elevated position. The trailer may be moved to a partially tilted position and employed to spread granular material such as gravel, etc. The operator may of course increase the angularly tilted position of the trailer body as the material is progressively unloaded. The draw bar 101 is thus employed as a part of the hoisting apparatus. A short or low jib pole may therefore be used as when the trailer is operating under trees in orchards, etc.

Second: Material handling. With the locking bolts 107 and 112 tightened, the cable 122 may be employed to move material such for example as the loading or unloading of the trailer body. The hook 123 facilitates the attaching of the cable to the material to be moved. The power unit or winch may of course be used for material handling purposes. In Fig. 10 the dotted line D illustrates the cable 122 extending around the lower sheave 117 for loading when the trailer is locked in its normal position. The dotted line F shows the cable extending around the upper sheave 115 for use when the trailer is in the tilted position illustrated at A.

In lowering the trailer from the tilted to its normal position, the cable 122 is replaced on the bracket 110, the dog 120 set in contact, the upper lock bolt 112 loosened. The trailer body may then be lowered by actuating the winch 124 or the brake 121.

Third: The draw bars 101 may be adjusted vertically to accommodate tractor vehicles having their attaching means set at various vertical heights. As illustrated in Figs. 1 and 3 the trailer is attached as a semi-trailer to an automotive tractor. In Fig. 10 the draw bars 101 illustrated in the solid line position are located at a height suitable for attachment to this same type of traction vehicle. The dotted line position B of Fig. 10 illustrates the draw bars 101 adjusted to a lowered position for attachment to such traction vehicles as farm tractors.

This adjustment is made by lowering the jib pole 109 to support the front end of the trailer. The upper locking bolt 112 is then tightened to hold the front end of the trailer in a predetermined position. The lower locking bolt 107 is released and if desired the cable 122 may be attached to the draw bars 101. The winch may then be operated as previously described for elevating the trailer. When the draw bars 101 are located in the desired position the lock bolt 107 may again be tightened to hold the draw bars firmly in the adjusted position. The jib pole 109 may then be elevated and locked to the trailer. The brackets 125 attached to draw bars 101 make possible the lowering of the hinge point 102 on the rear end of draw bars 101 to a location to form the center point of arc or circle at pivot point of lock bolt 107 on the draw bars 101. The primary purpose of this adjustment is to hold the jib poles 109 in a substantially perpendicular position when the draw bars are adjusted to the lower position.

Fourth: The adjustable parking leg or landing gear (See Figs. 4, 10 and 11). In Fig. 10 the jib poles 109 are shown in solid lines in their normal positions; the dotted lines C show the jib poles dropped or lowered to the ground to form a support for the forward end of the trailer. The jib poles 109 may if desired be equipped with wheels or casters at their lower ends, to facilitate moving the trailer when it is disconnected from the traction vehicle and the jib poles are locked in the supporting position.

When the jib poles 109 are used as a parking leg, the trailer frame and parking leg may be elevated or lowered simultaneously by loosening both of the lock nuts 107 and 112, allowing the trailer and draw bars to move vertically simultaneously or independently on the jib poles 109. These movements can be controlled by the cable operated by the winch and controlled by the dog 120 in contact and with the winch to raise or lower the trailer at will. When the trailer is set in desired position the locks 107 and 112 as a safety measure should be tightened. Should it be desired to change the relative position of the draw bars 101 or the trailer frame 100, it is only necessary to release one of the locking bolts 107 or 112 respectively.

From the foregoing it is to be understood that numerous variations of structural details both of the tractor and trailer vehicles may be permitted within the scope of the present invention, and further that various types of suitable fifth wheel or coupling mechanisms may be used with the vehicle construction embodying the present invention.

I claim:

1. A semi-trailer comprising fixed frame members, a body frame secured to said frame members, supporting wheels connected with said frame members adjacent one end thereof, swinging frame members pivotally connected to the opposite ends of said fixed frame members and extending forwardly of the body frame secured to said fixed frame members, a hoist carried by said swinging frame members and operably connected with the forward end of said body frame to selectively support the forward end of the trailer when uncoupled from the tractor or to elevate the forward end of the body of said trailer relative to said swinging frame members and to effect pivotal movement thereof about their points of pivotal connection with said fixed frame members, and means for selectively locking said hoist to the body frame or to the swinging frame members to maintain said trailer in the desired position.

2. A semi-trailer comprising fixed frame members, a body frame secured to said frame members, supporting wheels connected with said frame members adjacent one end thereof, swinging frame members pivotally connected to the opposite ends of said fixed frame members and extending forwardly of the body frame secured to said fixed frame members, a hoist comprising a mast carried by said swinging frame members and operably connected with the forward end of said body frame to selectively support the forward end of the trailer when uncoupled from the tractor or to elevate the forward end of the body of said trailer relative to said swinging frame members and to effect pivotal movement thereof about their points of pivotal connection with said fixed frame members, a cable sheave carried adjacent the top end of said mast, a cable sheave secured to and carried by said body frame members, a winch secured to said fixed frame members and a cable operably connected at one end to said winch and threaded through said sheaves and detachably connected at the opposite end with said body frame members, and means for locking said hoist to maintain said trailer in the desired position.

3. A semi-trailer comprising fixed frame members, a body frame secured to said fixed frame members, supporting wheels connected to one end of said fixed frame members, swinging frame members pivotally connected to the opposite ends of said fixed frame members and extending forwardly of the body frame secured to said fixed frame members, a hoist carried by said swinging frame members and operatively connected with the forward end of said body frame to selectively support the forward end of the trailer when uncoupled from the tractor or to elevate the forward end of said trailer by effecting pivotal movement of the swinging frame members about their points of pivotal connection with said fixed frame members and including a mast, a cable sheave carried adjacent the top end of said mast, a cable sheave secured to and carried by said body frame member, a winch secured to said fixed frame members and including a rotatable drum, a cable having one end secured to said rotatable drum and threaded through said sheaves and having its opposite end detachably connected with said body frame members, and means for releasably locking said body frame members in a selected position on said mast.

4. A semi-trailer having a longitudinally extending frame, a pair of wheels positioned nearer one end of the frame than the other, draw-bar means pivotally connected to the frame adjacent one end of the trailer, a vertically movable hoisting mast, and separate manually operable means to selectively lock the mast to the draw-bar or to the frame.

5. In a semi-trailer having a longitudinally extending frame, supporting wheels positioned adjacent one end of the frame, a draw-bar hingedly mounted to the frame and movable about a substantially horizontal axis, a mast associated with the frame and draw-bar and movable between ground engaging and elevated positions, and means associated with the mast to selectively vary the angular relation of the frame and draw-bar members.

6. A semi-trailer comprising a longitudinally extending frame, a body carried by the frame, supporting wheels carried by the frame adjacent one of its ends, a draw-bar hingedly mounted adjacent the other end of the frame, a jib pole detachably connected to the draw-bar, and power transmitting means carried by the jib pole and operably connected to the body frame whereby the end of the frame adjacent the draw-bar may be pivoted about the supporting wheels to an angular position.

7. A semi-trailer having a longitudinally extending frame, a pair of wheels positioned nearer one end of the frame than the other, draw-bar means pivotally connected to the frame adjacent one end of the trailer, a vertically movable hoisting mast, manually operable means to selectively lock the mast to the draw-bar or to the frame, and power transmitting means operably connected with the mast and engageable with the frame when the mast is locked to the draw-bar to vary the angular position of the frame.

8. In a semi-trailer having a longitudinally extending frame, supporting wheels positioned adjacent one end of the frame, a draw-bar hingedly mounted to the frame and movable about a substantially horizontal axis, a mast associated with the frame and draw-bar and movable between ground engaging and elevated positions, motion transmitting means including a cable carried by the frame and engageable with the frame or draw-bar members over the mast to elevate or lower the frame or draw-bar members, and manually operable means including a crank operated winch to control the motion transmitting means.

9. A semi-trailer comprising a longitudinally extending frame, a body carried by the frame, supporting wheels carried by the frame adjacent one of its ends, a draw-bar hingedly mounted adjacent the other end of the frame, a jib lockably mounted on the frame and movable vertically relative thereto, and a power actuated cable extending over said jib and connected with a portion of said body whereby the draw-bar may be selectively elevated or lowered by the movement of said cable.

10. A semi-trailer having a longitudinally extending frame, a pair of wheels positioned nearer one end of the frame than the other, draw-bar means pivotally connected to the frame adjacent one end of the trailer, a vertically movable hoisting mast, manually operable means to selectively lock the mast to the draw-bar or to the frame, and power transmitting means operably connected with the mast and engageable with the draw-bar when the mast is locked to the frame to vary the vertical position of the draw-bar relative to the frame.

NUGENT MILNER.